Feb. 21, 1961        D. O. BENSON        2,972,218

POWER MOWER WITH FULL FLOATING CUTTING UNIT

Filed May 23, 1958        2 Sheets-Sheet 1

INVENTOR.
DONALD O. BENSON
BY
Williamson, Schroeder, & Palmatier
ATTORNEYS

Feb. 21, 1961 D. O. BENSON 2,972,218
POWER MOWER WITH FULL FLOATING CUTTING UNIT
Filed May 23, 1958 2 Sheets-Sheet 2
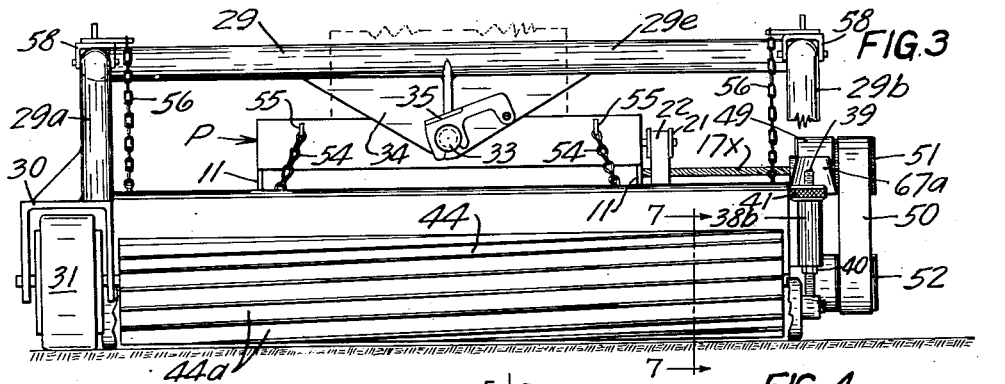
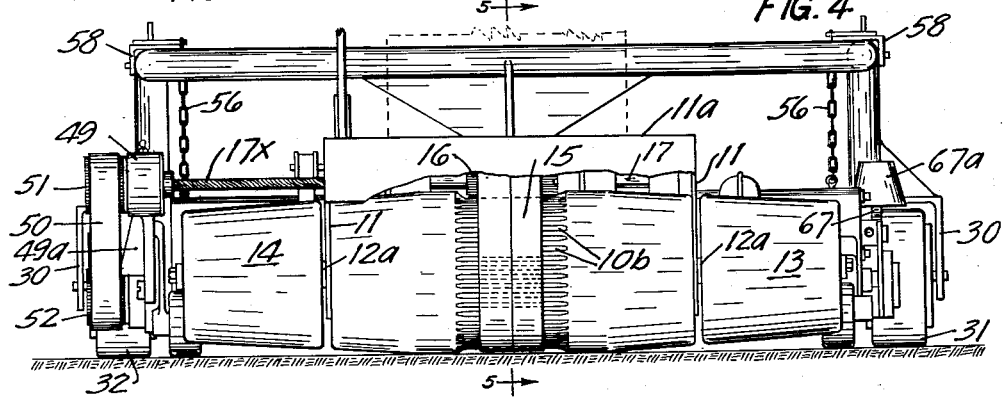
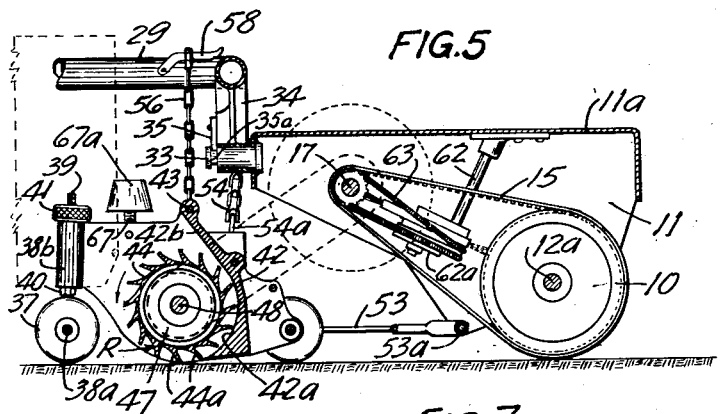
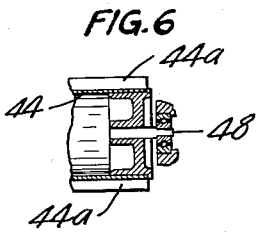
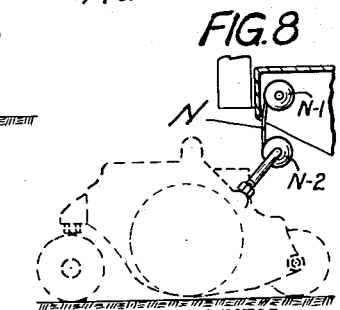
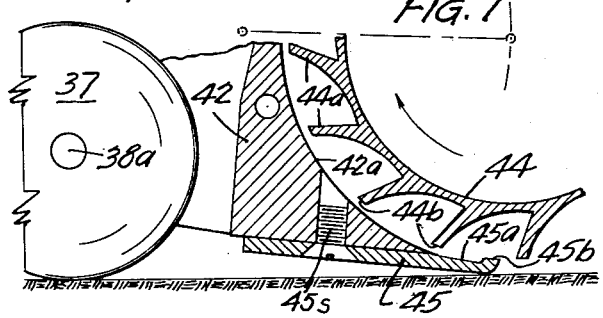
INVENTOR.
DONALD O. BENSON
BY
ATTORNEYS.

United States Patent Office 2,972,218
Patented Feb. 21, 1961

2,972,218

POWER MOWER WITH FULL FLOATING CUTTING UNIT

Donald Otto Benson, Minneapolis, Minn., assignor to Toro Manufacturing Corporation, Minneapolis, Minn., a corporation of Minnesota Filed May 23, 1958, Ser. No. 737,266

5 Claims. (Cl. 56—26)

This invention relates to power mowers particularly adapted to efficiently operate upon golf-course greens or other dense grass areas where uniform and close cutting is required regardless of undulations, slopes and variations in the contour of the sod or ground.

It is a main object of my present invention to provide an improved and highly efficient power mower employing a traction or propulsion unit and an independent and full floating cutting unit connected therewith for travel over the ground, but nevertheless being independently supported from and conforming to the varying ground contours and having an extremely short wheel base to obtain a very close ground conformance.

A further object is the provision of a light, easily guided power mower of the class described which is particularly efficient in operation upon golf-course greens and the like where close and uniform cutting is required.

Prior art greensmowers and the like, to my knowledge, have constituted integrated reel-type machines where the cutting mechanism was directly and adversely affected by the over-all weight of the machine and propulsion medium, the undue influences of the operator, the varying weight of accumulated grass clippings and by the vibratory effects of the engine and the weaving and tilting of an integrated traction chassis and cutter mechanism.

With my novel and improved machine, the cutting unit traveling on its own short wheel base, is completely independent of the several adverse influences of most conventional greensmowers and the like, as recited in the previous paragraph.

A further object is the provision of a power mower employing an over-all articulated traction unit in combination with an independent ground-supported cutter unit having a very low center of gravity and moved forwardly through its connection with said traction unit but connected therewith for full floating and articulated relation thereto regardless of rapidly changing contour of the ground over which my machine travels.

A further object is the provision of a power mower of the class described having a total weight substantially less than the prior art mowers used for analogous purposes, such reduced weight with the inherent structure of my improved machine facilitating, guiding, reducing compaction of the coil in operation and also substantially eliminating friction burning of the turf during skidding turns.

Ease of assembly and disassembly for facilitating repairs and also for freight/or hauling in unit packages is a further object.

The foregoing and a number of additional objects and advantages of my invention will be more clearly apparent from the following description made in conjunction with the accompanying drawings wherein like reference characters refer to similar parts throughout the several views and in which:

Fig. 3 is a front elevational view with some portions broken away taken along the line 3—3 of Fig. 1;

Fig. 4 is a rear elevational view of the same taken along the line 4—4 of Fig. 1;

Fig. 5 is a vertical cross section taken on a reduced scale substantially along the line 5—5 of Fig. 4;

Fig. 6 is a detail vertical section taken axially of the cutter reel along the line 6—6 of Fig. 2;

Figure 1:
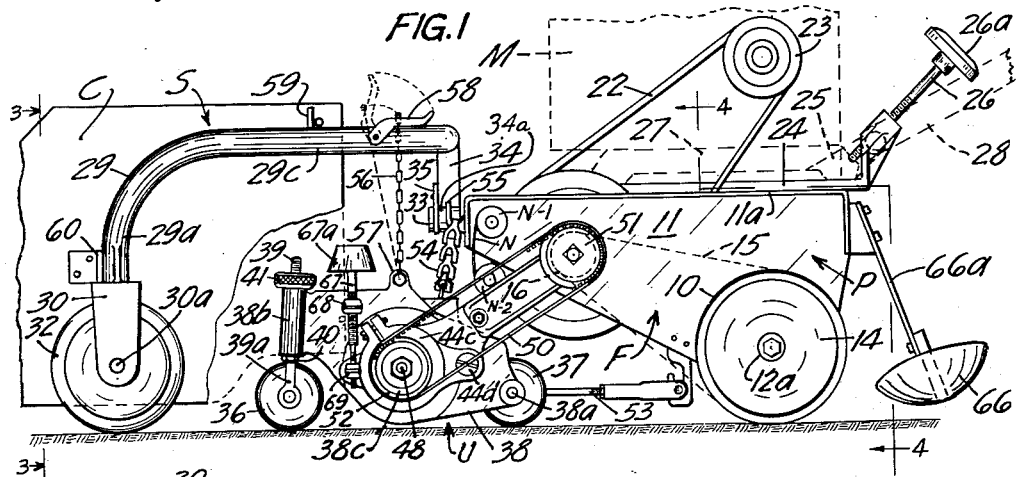
Fig. 1 is a side elevational view showing an embodiment of the invention with dotted lines indicating a detachable motor and guiding and control unit.

Fig. 7 is a detail vertical section on an enlarged scale taken substantially along the lines 7—7 of Fig. 3 showing the shearing relationship between the reel and the bed knife of the cutting mechanism and showing also the combined bed-knife-supporting structure and deflector medium for guiding the grass clippings into the forwardly disposed "catcher" and which suffices also in the capacity of effectively reinforcing the very thin bed knife; and Fig. 8 is a side elevational view of the cutting mechanism with its flexible connection at one end thereof with a forward portion of the propulsion medium to counterbalance the additional weight influence of the driving mechanism through the medium of a constant-spring-rate mechanism.

Referring now to the accompanying drawings which illustrate a successfully tested embodiment of my invention, an articulated traction unit is provided, comprising a rear propulsion section or assembly indicated as an entirety by the letter P and a forward ground-engaging section indicated as an entirety by the letter S which functions as will later appear to stabilize weight distribution and to guide the machine and also, to directly support the collector or catcher C for the cut grass.

The propulsion assembly P includes a central, driven ground-engaging roller 10, preferably constructed of extruded or cast metal and preferably covered with a soft compressible casing 10a. The driven roller 10 is suitably journaled on an axis mounted on the lower or sump portion of a propulsion chassis frame indicated as an entirety by the letter F, and comprising rigid spaced side plates 11, a horizontal motor support or deck 11a and various skeleton bars and framework, some of which will be later specifically described. The axle upon which driven roller 10 is mounted has extension shafts 12a at the ends thereof, upon which idler ground-engaging rollers 13 and 14 respectively are freely journaled. Said ground-engaging rollers taper outwardly from their inner ends which are in close spaced relation to the outer ends of the driven roller 10 whereby in most of the travel of the machine, said idler rollers are slightly out of engagement with the ground, but come into play and operation when slopes and undulations are encountered extending transversely or laterally of the line of travel and are particularly useful in guiding and in turning the machine.

As shown, the ground roller 10 has a slightly diminished intermediate portion 10b which is ribbed or corrugated for frictional driving engagement from an endless belt 15 trained thereabout. The upper portion or run of belt 15 is trained about a cylindrical longitudinally ribbed driving member 16 (see Figs. 2, 4 and 5) which is journaled on a jack shaft 17 suitably mounted in bearings 17a indirectly supported from the side plates 11 of the propulsion frame. Bearings 17a will be supported from the side plates 11 of the propulsion frame by means of supporting brackets (not shown) which suitably interconnect the side plates with their associated bearings 17a. A male clutch element 18 is keyed to the right hand portion of jack shaft 17 for limited sliding movement thereon and for engagement with a female clutch member 16a which is formed at one end of the roller-driving member 16. A clutch operating shifter arm 19 straddles or surrounds the male clutch element 18 and is actuated, as shown, by a longitudinally movable operating handle 20 extending through the right hand side plate of the propulsion frame and terminating in a knob 20a.

As shown, a large V-belt pulley 21 is affixed to the left end portion of jack shaft 17 and is connected for driving by an endless V-belt 22 with the smaller V-belt pulley 23 of the power take-off of a motor or engine indicated in dotted lines by the letter M. While various motors or sources or power may be utilized, the drawings diagrammatically indicate a detachable motor, guiding and control unit having a base which closely interfits longitudinal receiving plates 24 affixed to the marginal side portions of the motor support or deck 11a. A recessed abutment 25 is provided at the rear edge of the motor, which is securely clamped and secured by a heavy set screw 26 having an enlarged knob 26a at the upper end thereof for facilitating manipulation. The motor M has a suitable rigid base 27 to which is pivotally connected an operator's guiding handle 28 extending outwardly and rearwardly from the machine and preferably being angularly adjustable with fixed relation to the base of the motor and to the propulsion frame F. Throttle and other motor controls are mounted in conventional manner (not shown) on the handle.

The forward section S of the over-all traction unit as shown, comprises a wide supporting fork 29 terminating in vertical right and left posts 29a and 29b respectively which have rigidly affixed to the lower ends thereof as shown, depending U-shaped wheel mounting brackets 30 having stub axles 30a at the lower ends thereof, upon which the widely spaced and externally cushioned right and left forward wheels 31 and 32 respectively are journaled. The wide front fork 29 has widely spaced horizontally extending overhanging arms 29c and 29d respectively which are spaced apart as shown, a distance slightly greater than the combined length of the propulsion roller 10 and the axially aligned idler rollers 13 and 14. The widely spaced arms 29x and 29d accommodate and support a large grass catcher C for the full width of the cutting reel. The overhanging arms 29x and 29d are rigidly interconnected or formed integrally with a transverse cross bar 29e which overhangs a horizontal and longitudinally extending connection pin 33 affixed centrally and pivotally to the forward end of the propulsion frame F. A rigid reinforced depending bracket 34 of triangular shape is welded or otherwise affixed to the central portion of the rear cross bar 29e of the front fork and this bracket has a bearing 34a for receiving the forward connection pin 33 of the rearwardly disposed propulsion frame. Quickly releasable locking means such as the pivoted dog 35 is provided for securing the connected parts 33 and 34, as shown, said dog having a circular concave edge which engages an annular groove 35a in the forward portion of the heavy connecting pin 33.

With the pivotal connection through pin 33 and bracket 34, it will readily be seen that the front ground-engaging section S of the traction unit is freely articulated in a transverse manner with reference to the rear propulsion assembly P to permit relative weaving and swinging of the two sections of the over-all traction unit along the axis of the heavy connection pin 33, whereby if variations and slopes exist in the ground or terrain traveled, the front section S may freely conform at all times to such variations, lateral slopes or undulations while the propulsion unit may likewise conform to the particular variations in the ground at all times in its travel, thereby, eliminating uneven distribution of total weight imposed upon the respective sections or assembly of the traction unit, thereby maintaining traction at all times which in effect makes the traction unit a three point support or non-redundant unit.

A very important feature of my invention operating in close combination with my articulated traction unit, is the provision of an independent, full floating cutter unit indicated as an entirety by the letter U. Cutter unit U is supported in operation (with exceptions later to be described), directly from the ground over which it travels through the medium of a wide chassis having a very short wheel base which as shown comprises forward and aft rotary ground-engaging elements 36 and 37 which may constitute various types of rollers, wheels or the like. In the form of my invention applied to golf-greens-mowers with my preferred type of cutter reel mechanism the wheel base of the independent cutter unit chassis may be as short as seven inches whereby the cutting or shearing mechanism along the cut or clips will truly conform to variations in the ground over which it travels. The cutter unit chassis under normal conditions, is free to tilt along various fulcrums or axes longitudinal of the travel of the machine, as well as along its transverse axis to conform to undulations disposed longitudinally of the travel of the machine. The very low center of gravity contributes substantially to the contour following ability of the cutter unit.

The independent cutter unit U is light in weight and includes a pair of rigid widely spaced side plates 38 between the forward and rear ends of which, in suitable bearings, are journaled the axles 36a and 37a of the front and aft ground-engaging elements or rollers. In the particular form illustrated the rollers 36 and 37 have spiral treads for the purpose of compacting the ground and grass, as little as possible in the travel of the cutter unit (see Fig. 2). Because of the very light weight of my cutting unit the area of supporting rollers should be minimized to enable very close cutting to be obtained. At the two ends of each of the rollers 36 and 37, wheel sections 36b and 37b are attached to the respective axles, being as shown of substantially similar diameter to the diameters of the spiral configuration of said rollers. The axle 37a of the rear roller is journaled at its ends in bearings 38a provided at the rear and lower corners of the cutting unit side plates 38. The forward end of the cutting unit frame is mounted upon the forward roller 37 for vertical adjustment to vary the height of the effective cut. To this end as shown, upstanding sleeves 38b are affixed to the forward ends of the side plates 38 of the cutter chassis, receiving elongated threaded bolts 39 which are integrally formed with depending axle-engaging arms 39a at the lower ends thereof (see Figs. 1 and 5). A lower adjustment nut 40 is threadedly mounted on each of the bolts 39 above the respective axle-engaging arms 39a and abuts against the lower ends of the associated sleeve 38b, while on each bolt near the upper end thereof an enlarged, knurled nut 41 is provided for clamping the respective bolts 39 to the associated sleeves 38b.

A combined, rigid bed bar and deflector housing 42 providing a complete back plate completes the cutting unit chassis, extending transversely of the machine at low height and being rigidly interconnected by bolts 43 with the rigid side plates 38 (see Figs. 5 and 7), thereby providing exceptional stiffness because of its total height and resulting high vertical moment of inertia. Bed bar 42 provides a concave, continuous forward surface arcuate in cross section at the lower portion 42a thereof and extending forwardly and upwardly and substantially tangential to said arcuate portion, at its upper area 42b. A multi-bladed cutter reel indicated as an entirety by the letter R, is suitably journaled in bearings 38c secured medially to the side blades 38 of the cutting unit chassis, said reel extending transversely of the machine, close to ground and concentrically of the lower and forward arcuate portion 42a of the bed bar. For greensmowers and the like, the cutter reel R is of over-all small diameter and if integrally extruded as I prefer, may have an over-all diameter of from only 3 to 4 inches concurrently maintaining very high bending strength.

The reel R illustrated may be very advantageously constructed from an aluminum alloy and as shown, is of tubular form 44 having a great multiplicity of integral, gently spiraled blades 44a which as clearly shown in Figs. 5 and 7, angle forwardly from the tubular hub in the direction of revolution of the reel for purposes and advantages to be later described herein. The leading sides of the blades 44a are preferably converted to corundum or aluminum oxide by electro-chemical means leaving the blade edges and trailing sides of the blades uncoated. A comparatively thin bed knife 45 is provided (see Fig. 7), made from hard steel such as spring steel detachably secured to the flat lower edge of the bed bar by a plurality of counter-sunk screws 45s. This bed knife may be as thin as a sixteenth of an inch as shown in Fig. 7, forming a straight, narrow and horizontally disposed cutting edge 45b for shearing cooperation with the cutting edges 44b of the cutter blades. To additionally thin the forwardly extending portion of the cutter blade 45, the upper surface is recessed at 45a (see Figs. 5 and 7) up to the slightly thickened cutting edge 45b.

With the construction of the cutting unit as described the center of gravity of the entire unit is extremely low approximately only 2½ inches above the ground in the greensmower embodiment of my invention illustrated. The small reel and the integral bed bar with its back plate structure contributes to the effective strength of the bed knife because the over-all size thereof permits a shorter overhang or cantilever of the bed knife, as contrasted with conventional larger diameter reel-type cutting mechanism.

The tubular extrusion 44 of the cutter reel is closed at its ends by plug members 47 to which the axle shaft 48 is affixed. Such tubular integral construction and plug ends and axle provide unusual stiffness and my extruded multi-blade construction, gives greater strength and rigidity than blades attached to occasional spiders in the manner of prior art reel cutters. Deformation of the entire reel from impact is, therefore, much less likely to occur. Should this reel be run into small hard objects, such as stones, coins or the like, there is usually no need for corrective action since continuation of operation will produce a shearing fit in spite of dents and bends due to the relatively softer aluminum metal of the reel and its blades as contrasted with the hard steel bed knife. Furthermore, because the blades in cross section are inclined forward from radial in the direction of revolution of the reel, any dents or bends at the cutting edge increases the radius and permits the bed knife to true the bent area to the previous generated cylinder of revolution.

As shown, the cutter reel R is driven from a flexible or universal-type extension shaft 17x extending from the left end of jack shaft 17, the outer end of extension shaft 17x being suitably journaled in a bearing 49 secured by an integral arm 49a to the left side plate 38 of the cutting unit chassis. As shown, a wide endless V-belt 50 connects a V-pulley 51 affixed to the outer extremity of shaft extension 17x to the driven V-pulley 52 affixed to the projecting left extremity of the cutter reel axle 48. The relationship of the driving pulley 51 rearwardly and above the driven pulley 52 is such that with the connection and thrust means of the cutting unit, as hereinafter described, the belt 50 will maintain constant center distance and will be equally taut in the variable floating movements of the cutting unit. To counter-balance the slight weight effect from the drive connection 49, 50, 51 and 52 at the left of the cutting unit, the opposite end of the unit may be counter-weighted slightly or as illustrated in Fig. 8 of the drawings, a conventional spirally wound strip-spring, balanced so that essentially a constant spring-rate exists through normal range of travel is imparted indicated as an entirety by the letter N and its housing connected as at N-1 with the forward left portion of the propulsion frame 11 and having the lower extremity of the spring strip connected as at N-2 to the rear left portion of the cutter-unit chassis U.

To propel the independent cutting unit, articulated thrust arms 53 are provided extending horizontally forward from ball and socket connection 53a with the sump portions of the respective heavy side plates 11 of the propulsion frame, said thrust arms 53 having forward loop portions 53b which surround and are pivotally connected with intermediate unspiraled portions of the rear roller axle 38a. The articulated thrust arm connection described and illustrated permits weaving action of the entire cutting unit supported on its own wheel base and in directions transversely of the course of travel and also permits tilting of the short base cutter chassis along axes disposed transversely of the course of travel. My structure, since thrust is imparted to the axle of the cutting unit cannot receive an upsetting torque reaction in operation and travel. The lines of thrust imparted to the cutting unit from the propulsion unit lie parallel and very close to the ground.

Slack supporting connections of the cutter unit with the forward and overhanging portion of the rear propulsion unit P, are provided to facilitate through operator control, lifting of the cutting unit from ground in making turns and the like. To this end as shown, a pair of slack chains 54 are connected at their lower ends with lugs or loops 54a provided at intermediate portions of the top of the bed bar 42 and the upper ends of chains 54 are suspended from hook loops 55 affixed to the front end of the propulsion frame (see Figs. 1, 3 and 5).

To enable the chassis of the cutting unit to be tilted on a fulcrum extending parallel to the line of travel so that "tapering" may be made in the cut as for example between the edges of a golf putting green and the surrounding apron or collar as well as to facilitate over-all elevation of the cutting unit for transportation, I flexibly connect right and left end portions of the cutter chassis with the overhanging rear portions of the fork arms 29c and 29d. As shown, slack chains 56 are connected at their lower ends with suitable lugs 57 provided at the upper edge of the bed bar (see Figs. 1 and 5) and said chains at their upper ends are detachably connected with pivoted shiftable arms 58 which may be individually swung to lift a desired end of the cutter unit. Thus when one end of the cutter unit is lifted, it is then supported from the over-hanging fork of forward section S and when both arms 58 are swung, the forward roller 37 of the cutter unit and the cutting reel and bed knife are lifted well above the ground to facilitate transportation of the machine.

The forwardly disposed "catcher" or collector for grass clippings is solely supported upon the forward traction section S (a portion thereof being shown in Fig. 1 and a portion outlined in dotted lines in Fig. 5), having horizontal abutments or brackets 59 for engaging and resting upon the medial portion of the arms 29c and having embracing brackets 60 on the intermediate portions of the external side walls for engaging the vertical post portions 29a and 29b of the fork section and for support upon the wheel-mounting brackets 30.

The high bed bar 42 defining the trough portion 42a of arcuate cross section and the upward and forward tangential portion 42b in combinative relation with the cutting reel R, directs and deflects the grass clippings upwardly and then forwardly into the open rear end of the collector or catcher C.

Figure 2:
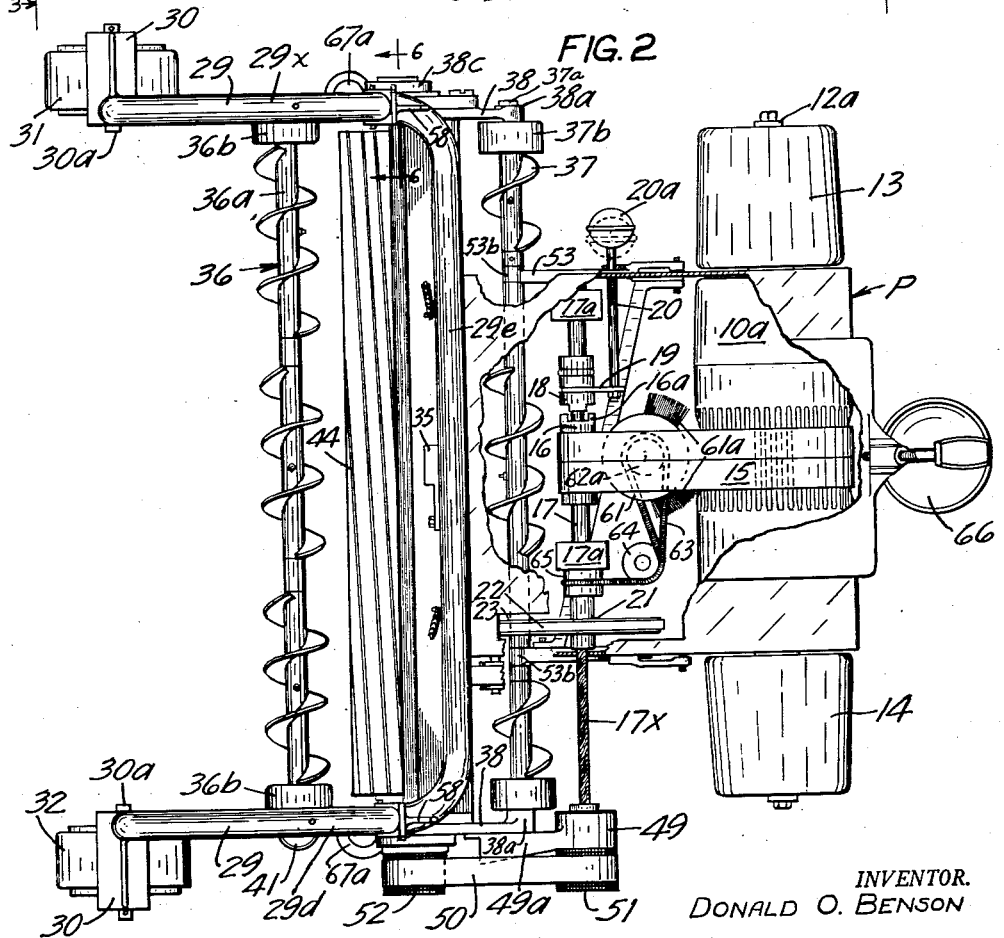
Fig. 2 is a top plan view of the same with some portions of a deck and the motor support being broken away and with the grass catcher removed.

If desired, a vertical brush drum 61 having several sets of radial bristles 61a may be mounted just forwardly of the central corrugated driving portion of driven roller 10 and disposed medially within the confines of the endless driving belt 15 and as shown in Figs. 2 and 5, mounted on a shaft 62 inclined rearwardly from the vertical, which shaft has affixed thereto a pulley 62a about which is wound a crossed endless driving element 63 guided over idler pulleys 64 and trained about a sprocket or ribbed driving element 65 affixed to jack shaft 17 adjacent and on the left side of the left bearing for said shaft. The brush continuously moves clippings from the propulsion roller 10 and also from the driving element 16.

To facilitate quick skid turning of the machine at the completion of straight line cutting operations, the operator pushes downwardly slightly on the guiding handle 28 and a part of the weight of the traction unit and the cutting unit may be applied to a deeply disked skid shoe 66 connected with the medial portion of the rear of the propulsion frame F through as shown, the medium of a depending, somewhat resilient arm 66a. The skid disk 66 may be utilized as a pivot to facilitate skid turning. The exact location of this disk may be adjusted vertically to suit the operator.

Suitable means are provided for adjusting the shear between the cutting edges 44b of the reel and a straight cutting edge 45b of the stationary bed-knife. It is important that in the relative vertical movement between reel and bed-knife that the orbit of the reel blades 44a be as nearly possible concentric with the arcuate deflector surface 42a of the bed bar. I prefer, as shown, two mounted bearings 38c for the reel axle on adjustable oscillatory arms 44c which are pivoted at their rearward ends on pivot pins 44d at each side of the cutter unit, said pins being substantially, horizontally aligned with a medial positioning of the axle 48 of the cutter reel. Readily adjustable screw mechanism 67 as shown, is provided for each end of the cutter reel having a knob 67a for facilitating turning of the vertical screw 67 which threadedly engages a lug 68 one being affixed to the outer side of each of the side plates 38 of the cutter unit frame. The lower and diminished extremity of the screw 67 swivelly engages a pivot lug 69 affixed to the forward end of the respective bearing-carrying arm 44c. By having the bearing-carrying arms 44c pivoted as shown, rearwardly of the arcuate deflector surface 42a of the bed bar, within the limits of arcuate adjustment of the cutting reel, the orbit of the reel blades 44a is substantially always concentric with said arcuate surface 42a.

An important feature of my invention consists in the relationship of the very low center of gravity of the independent cutter unit (supported on its very short wheel base), with the length of the cutter reel and bed-knife (that is the actual width of the swath cut). In practically all power mower operations, a slope of more than 20° variation to horizontal is unusual. If a mower becomes unbalanced in cutting side slopes to the extent of 10% of the weight of the unit, particularly in greensmowers injury results and streaks are left in the grass cut. With my structure as described taking into consideration the very low center of gravity and the light weight reel, bed bar and bed-knife, very successful cutting operation is produced on side slopes which reach 40° from the horizontal.

I have discovered that to prevent damaging unbalance in cutting side slopes an approximate relationship of the heighth of center of gravity of the independent cutting unit and the width of the swath cut or length of the reel is extremely important. Thus, for a 21 inch reel and bed-knife, a center of gravity of the unit above ground should approximate only 2½ inches. For a 40 inch cutting reel to prevent damaging unbalance, the center of gravity of the cutting unit above ground should approximate 5 inches. The relationship desired between the said center of gravity and switch cut is approximately in the ratio of 1 to 8.

*Operation*

The general operation of my novel power mower will be obvious from the foregoing description. It is however, desirable to point out certain of the improved operating functions and advantages.

Subject to the clutch control handle 20, power from the motor is applied to driving member 16 journaled on the revolving jack shaft 17, which drives the elongated propulsion roller 10. The over-all traction unit including the forward section S and (through the articulated thrust arms 53), the cutting unit, are propelled and caused to travel over the golf green or other turf area to be cut. The very short wheel-base cutting unit mounted on front and rear roller means 36 and 37 conforms closely in its travel to the varying contour of the turf, fully floating with respect to both the propulsion assembly P and the front fork section S of the over-all traction unit.

With reel type cutting mechanism where the shearing edge is along a straight line disposed transversely of the line of travel, a very uniform and close cut may be obtained regardless of considerable variance through slopes, undulations and swales in the contour of the ground. The rear articulated connections, through thrust arms 53 with very low points of the propelling assembly, apply the forward thrust force below the center of gravity of the cutting unit and in a manner paralleling the point of application at the roller axle. Neverthless the cutting unit is caused to fully float relative to the respective positions of the propulsion assembly P and forward fork section S of the traction unit.

The invention is also readily applicable for other driven rotary units such as renovators, brushes and rotary cutting mechanism employing a plurality of vertical spindles.

The independent cutting unit of my machine has a very low center of gravity and therefore will always conform nicely to various undulations and slopes in the area to be cut, being minimally effected by such undulations and variations.

A substantial advantage is obtained in greensmowers and the like through the combination of the integrally formed, small diameter cutting reel R and the fully articulated connection between front and rear sections of the traction unit and between the thrust connections of the cutting unit with the propulsion assembly. The integral and preferably extruded construction of the small diameter reel R permits the formation of a multiplicity of integral blades 44a, thereby effecting with the reel revolving at low speed, a desirable and large number of cutting clips for each revolution of the reel. The light weight of the cutting reel, particularly if extruded integrally from aluminum alloy and its slow, desirable speed of operation, produces a very low inertia. Thus, if any sudden stoppage by a small solid object occurs, the same will not produce a severe load and resultant damage on the thin bed knife or the reel blades, as in prior art machines.

The independent ground-supported cutting unit is for all practical purposes in its operation, free of any influence from the accumulative weight of the propulsion assembly P and the articulated forward section S of the traction unit. The slight downward force influence from the weight of the drive connection through endless drive member 50 for driving the cutter reel, is neutralized by the constant load lift-spring mechanism N mounted on the same side of the machine, as the cutter drive, or by an increased, balance weight at the opposite side.

Minor jerks or impulses transmitted to the handle 28 by the operator, will not affect the operation of the independent cutting unit. Effective steering and guiding may be obtained because of the articulated relationship between the forward fork section S and the propulsion assembly P and because of the thrust connections between the propulsion unit P and cutter unit U. The said articulated relation enables the forward wheels of the traction unit to be supported on a slope while the propulsion roller 10 may be traversing level ground. Thus, effective distribution of the over-all weight imposed upon the traction unit is obtained at all times.

The accumulating weight of the collected grass clippings is entirely borne by the front section S of the traction unit, therefore having no influence on the effective cutting length of the cutting element. By this means a larger catcher can be utilized, requiring less frequent emptying by the operator.

The main components of the over-all machine may be readily disconnected or disassembled to facilitate individual packaging thereof to facilitate shipment and storage of the same. Thus, by disconnecting the pivotal connection 33 between the forward fork section S and the rear propulsion unit P the over-all traction chassis may be broken into the two principal units thereof for individual packaging or compact arrangement in a unitary package. It will also be clear that the independent, floating cutting unit U may be readily disconnected from the propelling unit P by disconnecting the thrust arms 53 and releasing the flexible connecting chains 54 and 56. Thus, short very narrow and light cutting units may conveniently, for repair or replacement of cutting blade be taken to a shop independently of the components of the overall traction frame. Conversely, it is very easy to quickly assemble the over-all machine for operation.

From the foregoing description, it will be seen that a very efficient power mower employing a fully articulated traction unit and an independent and full floating cutting unit has been provided which will very efficiently and uniformly cut grass under various conditions and regardless of normal undulations, slopes and variations of the contour of the turf.

It will further be seen that the invention is particularly applicable to very close cutting of grass on golf-course-putting greens and other instances where uniform cutting is required as close as an eighth of an inch from the ground.

It will, of course, be understood that various changes may be made in the form, details, arrangement and proportions of the parts without departing from the scope of my invention which consists of the matter shown and described herein and set forth in the appended claims.

What is claimed is:

1. A power mower for use on golf-course greens and the like comprising a tractor frame having fore and aft pairs of supporting wheels, said wheels having independent vertical movement relative to each other and a source of power thereon, a mower unit frame mounted intermediate said fore and aft pairs of wheels, said unit frame having a transversely extending cutting element and ground supporting rollers on said unit frame both fore and aft of said cutting element, and a pair of pivoted push rods interconnecting the aft portion of said mower unit frame and the rear portion of the tractor frame, and a flexible drive shaft means interconnecting said cutting element with said source of power.

2. A power mower for use on golf-course greens and the like comprising a tractor frame having fore and aft ground engaging means, said fore and aft ground engaging means having independent vertical movement relative to each other and a source of power thereon, a mower unit frame mounted intermediate said fore and aft ground engaging means, said unit frame having a transversely extending cutting element and ground supporting rollers on said unit frame both fore and aft of the cutting element, a pair of push rods interconnecting the aft portion of said mower unit frame and the rear portion of said tractor frame, and a flexible drive shaft means interconnecting said cutting element with said source of power.

3. The structure as defined in claim 2 wherein said cutting element is in the form of a horizontally disposed multi-bladed cutting reel and wherein said push rods are disposed substantially horizontally and below the center of gravity of cutting unit frame.

4. The structure as set forth in claim 2 wherein said tractor frame comprises a front section interconnected with and supported by said fore ground engaging means and a rear section interconnected with and supported by said aft ground engaging means, said sections having an articulate connection therebetween and disposed above said mower unit frame to permit relative lateral tilting of said sections about a substantially longitudinal axis.

5. The structure as set forth in claim 2 wherein said aft ground engaging means comprises a ground-engaging propulsion roller, and driving connections between said source of power and said propulsion ground-engaging roller for driving the latter.

References Cited in the file of this patent

UNITED STATES PATENTS

| | | |
|---|---|---|
| 2,041,126 | George et al. | May 19, 1936 |
| 2,475,671 | McCartney | July 12, 1949 |
| 2,505,878 | Blydenburgh | May 2, 1950 |
| 2,589,845 | Mott | Mar. 18, 1952 |
| 2,642,709 | Boyce et al. | June 23, 1953 |
| 2,924,928 | Rhoades et al. | Feb. 16, 1960 |